United States Patent [19]

Sweeny

[11] Patent Number: 4,750,968

[45] Date of Patent: Jun. 14, 1988

[54] TAPE APPLICATOR FOR EXTERIOR CORNERS

[75] Inventor: Henry D. Sweeny, Kitchener, Canada

[73] Assignee: Swenco Limited, Waterloo, Canada

[21] Appl. No.: 59,740

[22] Filed: Jun. 8, 1987

[30] Foreign Application Priority Data

Jul. 10, 1986 [CA] Canada .................................. 513514

[51] Int. Cl.[4] ......................... B32B 35/00; B44C 7/02

[52] U.S. Cl. .................................... 156/523; 29/110.5; 29/125; 156/463; 156/465; 156/468; 156/577; 156/579

[58] Field of Search ....................... 156/71, 304.3, 523, 156/527, 577, 579, 574, 524, 526, 575, 463, 465, 468; 29/110.5, 122, 125

[56] References Cited

U.S. PATENT DOCUMENTS

| | | | |
|---|---|---|---|
| 1,960,850 | 5/1934 | Lloyd | 156/526 |
| 2,929,089 | 3/1960 | Nall | 29/122 |
| 3,537,941 | 11/1970 | Miklos | 156/577 |
| 3,540,104 | 11/1970 | Duffy | 29/110.5 |
| 4,358,337 | 11/1982 | Johnson et al. | 156/524 |
| 4,555,298 | 11/1985 | Boucher | 156/523 |
| 4,707,202 | 11/1987 | Sweeny | 156/71 |

*Primary Examiner*—Michael Wityshyn
*Attorney, Agent, or Firm*—Jones, Tullar & Cooper

[57] ABSTRACT

A device for applying tape to an elongated exterior corner has a unitary head and a handle attached to one end thereof, the head being adapted to releasably and rotatably mount a roll of tape therein. A roller assembly at the other end of the head includes a triangular frame pivotally attachable to the head, and guide and applicator rollers rotatably mounted therein. The guide rollers are cylindrical and spaced apart on one shaft. The applicator rollers are frustoconical and are mounted on another shaft to define a V-shaped zone therebetween. During use, tape taken from the roll is preformed about the corner by the guide rollers and is stretched against the corner by the applicator rollers. The outer surface of each roller is softer than an inner core thereof to facilitate stretching of the tape and the ultimate conformance thereof to the corner.

16 Claims, 7 Drawing Sheets

TAPE APPLICATOR FOR EXTERIOR CORNERS

This invention relates to tape applicators in general and in particular to devices for applying lengths of adhesive tape to outside corners.

BACKGROUND TO THE INVENTION

Copending Canadian Patent Application No. 485,809 filed June 28, 1986 and assigned to the same assignee as the present application discloses a device for applying tape, preferably of the pressure-sensitive adhesive variety, to joints between abutting lengths of drywall panels or other material. The device of that application has a head which holds a roll of tape and also carries appropriate means for cutting the tape when the joint has been covered. A handle is attachable to the head and is used to control movement of the device as it is drawn along the joint whereby tape is drawn from the roll and applied to the joint. The handle carries a trigger mechanism for activating the cutting means.

The head of the device is also provided with an assembly that includes a tape guiding roller and a tape applying roller, the assembly being pivotally attached to the head so that the two rollers will always be adjacent the panels as the device is drawn along the joint. Two different interchangeable assemblies have been disclosed, one including cylindrical guide and applicator rollers for planar joints, the other including a cylindrical guide roller and an inverted V-shaped applicator roller for inside corner joints. In the latter assembly the guide roller is about one-half the width of the applicator roller and serves to preform the tape before it is applied to the joint. Both assemblies work very well at their intended functions.

In the drywall industry most exterior corners are formed by an exterior "bead" which is metallic and is nailed or screwed to the corner and is covered by drywall compound. This bead protects the corner from damage and ensures a straight edge at the corner.

In an analagous situation, but relating to exterior construction, it is common practice to cover the outside of a building with sheathing panels before a decorative siding is applied. The sheathing panels may have insulative properties and it is desirable to prevent air intrusion as much as possible. This means that joints between abutting panels should be sealed, including exterior corners. The most common sealing material is an adhesive tape, typically of about 2½ inches in width. Such tape is also applied to exterior corners since there are no requirements that would necessitate the use of a metal bead. To date there has been nothing available which would adequately enhance the task of applying adhesive tape to outside or exterior corners, whether of drywall or exterior sheating.

SUMMARY OF THE INVENTION

The present invention overcomes the deficiency outlined above by providing an assembly of guide and applicator rollers which can be used with a device such as that described in the above-identified application and which can be used to apply adhesive tape to exterior or outside corner joints. The assembly includes a pair of frame members of a triangular configuration connected together at one apex thereof by means, such as an axle, for pivotable connection to the head member of the tape applicator device. A pair of guide rollers is mounted between the second apices of the frame members, the guide rollers being cylindrical and axially spaced apart. A pair of applicator rollers is mounted between the third apices of the frame members, the applicator rollers being frustoconical in shape and defined a generally V-shaped space therebetween. All of the rollers have a generally hard core and a generally soft outer portion defining the running surface thereof.

As the tape applicator is drawn along an outside joint the tape will be drawn from its roll and will be preformed about the outside corner by the guide rollers with the adjacent inside circumferential edges thereof contacting the tape on each side of the corner and establishing initial contact between the tape and the underlying material. As the applicator moves along the joint the applicator rollers, having a high coefficient of friction, contact the tape over most of its surface and smooth and stretch it into place. At the end of the joint the tape will be cut and the applicator will be ready for another joint.

In its broadest form the present invention may be considered as providing a roller assembly for use with a device for applying tape, taken from a roll of tape mounted in the device, to an elongated, exterior corner, the assembly comprising: a pair of generally triangular frame members; a pivot shaft extending between the frame members at one apex thereof and adapted for removable pivotable connection to the device; a pair of mounting shafts extending between the frame members, one at each of the other apices; a pair of cylindrical guide rollers mounted for rotation on one of the mounting shafts with a space therebetween; and a pair of frustoconical applicator rollers mounted for rotation on the other of the mounting shafts, the frustoconical surfaces of the applicator rollers defining a generally V-shaped zone therebetween.

DESCRIPTION OF THE PREFERRED EMBODIMENT

Figure 1:
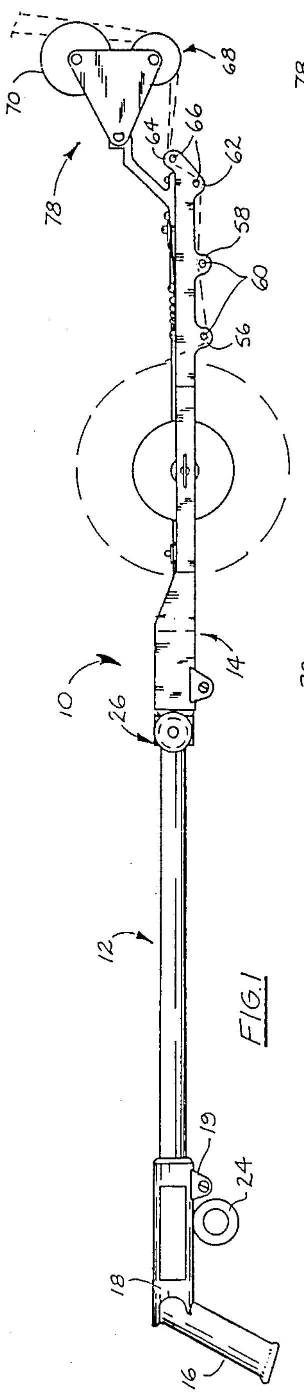
FIGS. 1, 2 and 3 show side, bottom and top views respectively of the device of this invention, absent the tape cutting means for the sake of clarity.

The applicator of the present invention is shown by the reference number 10 and includes two main components, namely the handle 12 and the head 14. Each of these components will be described in greater detail below.

The handle 12 is cylindrical, elongated and of tubular material, such as extruded aluminum. At its free end the handle is provided with an angled portion 16 which has a resilient grip similar to a bicycle hand grip. The angled portion is connected to a cylindrical tube 18 which is slotted along its bottom and has a pair of depending lugs 19. The tube 18 will slide onto the end of the handle and can be clamped thereto by way of a nut and bolt connecting the lugs 19 together. Below the tube 18 there is a short slot 20 which communicates with the hollow interior of the handle. A slider 22, whose purpose will become apparent hereinafter, is slidably contained within the handle 12 and is connected through the slot 20 with a circular ring or trigger portion 24. The ring 24 may be covered by a resilient elastomeric material, such as neoprene tubing.

A collar 26 is provided for sliding and rotating movement on the main part of the handle 12. The collar 26 includes an enlarged portion 28 having a radially directed through bore. Within the bore and resting against the outer surface of the handle 12 is a brass plug or bearing member. A cylindrical auxiliary handle 30 has a resilient grip 32 thereon and has, as well, a threaded rod or bolt 34 projecting from one end for threaded reception in the bore of collar 26. When the auxiliary handle 30 is rotated to engage the rod 34 with the bore, the end of the rod 34 will press against the plug in the bore to force it against the handle 12, and to pull the collar so that the other side thereof also bears against the handle 12. By loosening the auxiliary handle 30, the collar can be slid or rotated on the handle for positioning in any desired location to provide comfort and improve ease of use for the person using the applicator.

The head 14 is attached to the handle 12 at the end thereof opposite the angled portion 16. Preferably the body of the head 14 is a unitary aluminum casting, including a pair of side walls 36,36, end section 38 and webs 40,42 interconnecting the side walls.

Figure 2:
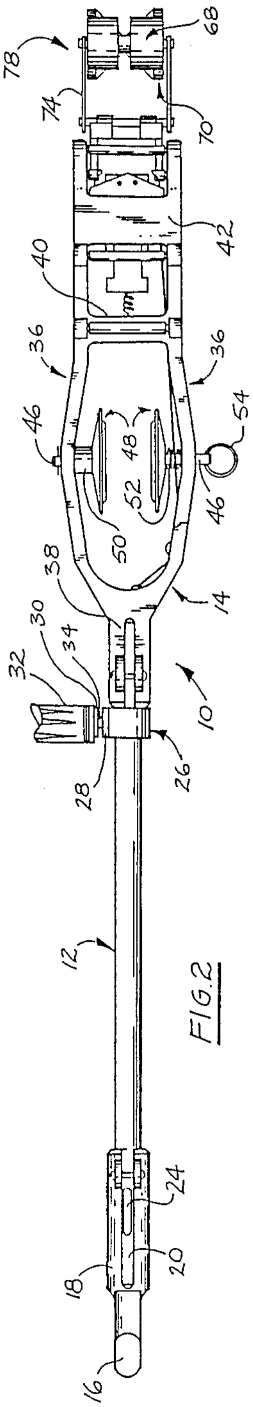
Figure 3:
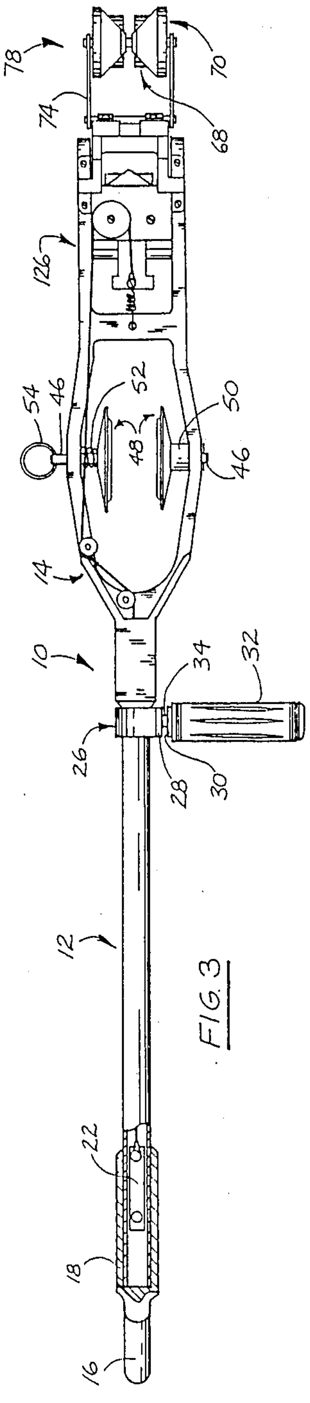

As illustrated in the drawings each side wall is bowed outwardly as at 44 adjacent the end section 38. At the area of maximum width each side wall has a through bore which receives a stub shaft 46 of a tape roll-holding disc member 48 such as is described in the aforementioned pending application. One of the disc members 48 (the upper one in FIG. 2) is at a fixed distance from side wall 36 due to spacer 50, while the other disc member can be moved towards its side wall 36 against the bias of spring 52 by pulling on ring 54 attached to the appropriate shaft 46. As shown in FIG. 3 it is possible to accomodate tapes of different widths, either by using spacers 50 of different lengths or by spring mounting both of the disc members 48. The spring mounting arrangement makes it very easy to load or unload rolls of tape from the applicator 10. Further details of the disc mounting arrangement can be found in the aforementioned Canadian patent application, as well as in commonly assigned Canadian Application Ser. No. 476,103 filed Mar. 8, 1985.

A pair of lugs or ears 56,58 are integrally cast with the side walls so as to extend downwardly therefrom in the vicinity of the webs 40,42 respectively. Each ear has a bore therethrough to receive the shaft 60 of a tape guide Broller, to be described hereinbelow. At the free end of the head member is a pair of longitudinally offset ears or lugs 62,64, the former extending below the side wall and the latter extending above the side wall. Each ear 62,64 has a bore extending therethrough to receive the shaft 66 of a tape guide roller.

Figure 4:
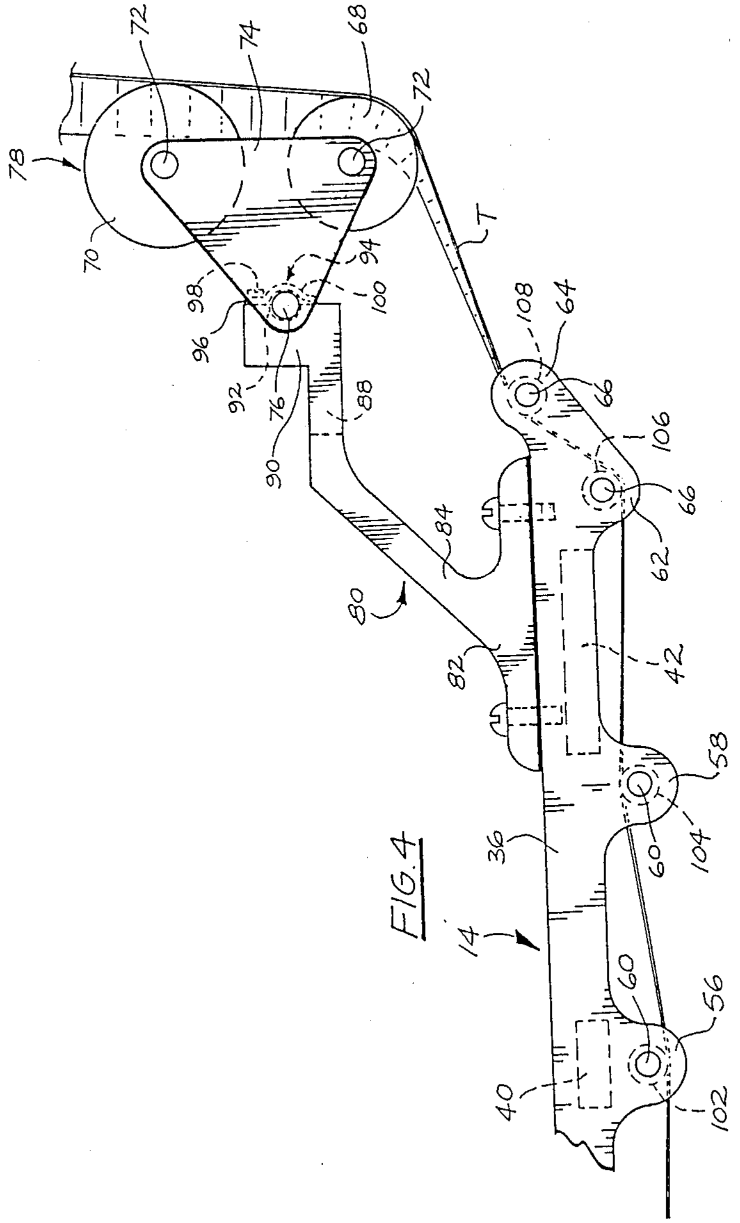
FIGS. 4 and 5 shows enlarged partial elevational and plan views of the head, including the roller assembly of the invention.
Figure 5:
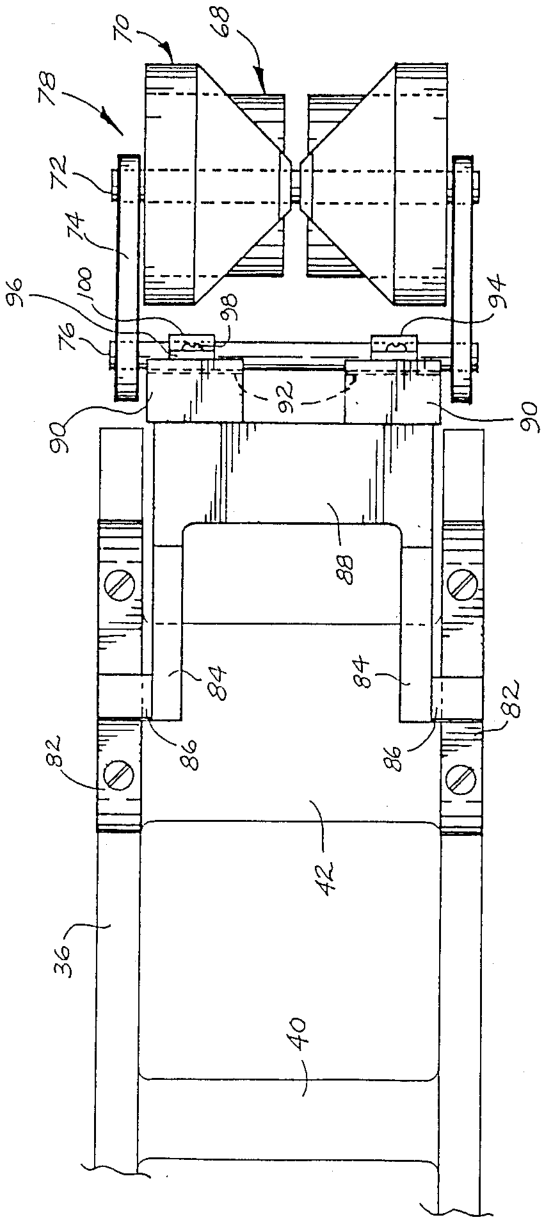

FIGS. 4 and 5 show the free end of the head member 14 and illustrate the manner in which tape guide and applicator rollers 68 and 70 are mounted to the head member.

The rollers 68,70 are each mounted on a respective shaft 72 which shafts are located at two apices of a triangular carrier frame member 74. A pivot shaft 76 connects the frame members 74 at the other apex. Preferably, the frame members 74 are permanently affixed to the three shafts 72,72,76 with the rollers 68,70 journaled on their respective shafts 72 for independent rotation thereon. Alternatively the rollers could be affixed to the respective shaft 72 which in turn could be journaled for rotation in appropriate bores in the frame members 74.

The frame members 74, rollers 68,70 and the appropriate shafts define a roller carrier assembly 78. The roller carrier is supported above and forwardly of the free end of the head member 14 by a carrier support 80. The carrier support may be an integrally cast unit which may then be bolted or otherwise secured to the upper edge of the head member.

The carrier support 80 includes a pair of elongated foot portions 82 spaced apart by an amount sufficient to permit each to rest on the top of a respective side wall 36. A forwardly inclined leg portion 84 projects upwardly from each base portion 82 and is offset inwardly from its base portion by a connecting portion 86. At their uppermost ends the arm extend forwardly, beyond the ears 64 and parallel to the side walls 36, the extensions of the arms being laterially interconnected by a web 88. A pair of enlarged lugs 90 are integrally formed at the forward edge of the web 88, each lug projecting above the web and forwardly thereof. The front vertical face of each lug has a transversely extending semicircular bearing recess 92 therein, adapted to receive a portion of the pivot shaft 76 of the roller carrier therein.

The shaft 76 is held in the recesses 92 by clips 94, there being one on each lug 90. Each clip 94 includes a flat portion 96 which lies against the front face of the lug and through which a machine screw or bolt 98 passes to connect the clip 94 to the lug 90. The clip also has a sprung, curved portion 100 which passes over the shaft 76 and applies an inwardly directed force thereagainst. The clip provides two main functions: (1) it holds the shaft 76 in the recess 92 thereby securing the carrier frame 78 to the applicator; and (2) it applies a frictional retention force to the shaft such that the force prevents unwanted pivotting movement of the carrier frame. The frictional force applied by the clips is not sufficient to prevent pivotting movement of the carrier frame when the applicator is in use.

FIG. 4 also shows the path taken by the tape T as it is fed from a roll of tape (not shown) held between the side walls 36 by the disc members 48. The tape T is taken from the roll and passes under a first guide roller 102 which extends between the ears 56 and is journaled on the shaft 60 supported by the ears 56. The tape then passes over a second guide roller 104 which extends between the ears 58, under a third guide roller 106 which extends between the ears 62 and over a fourth guide roller 108 which extends between the ears 64. The tape is then brought forwardly to pass around the guide roller 68 to the applicator roller 70.

Figure 6:
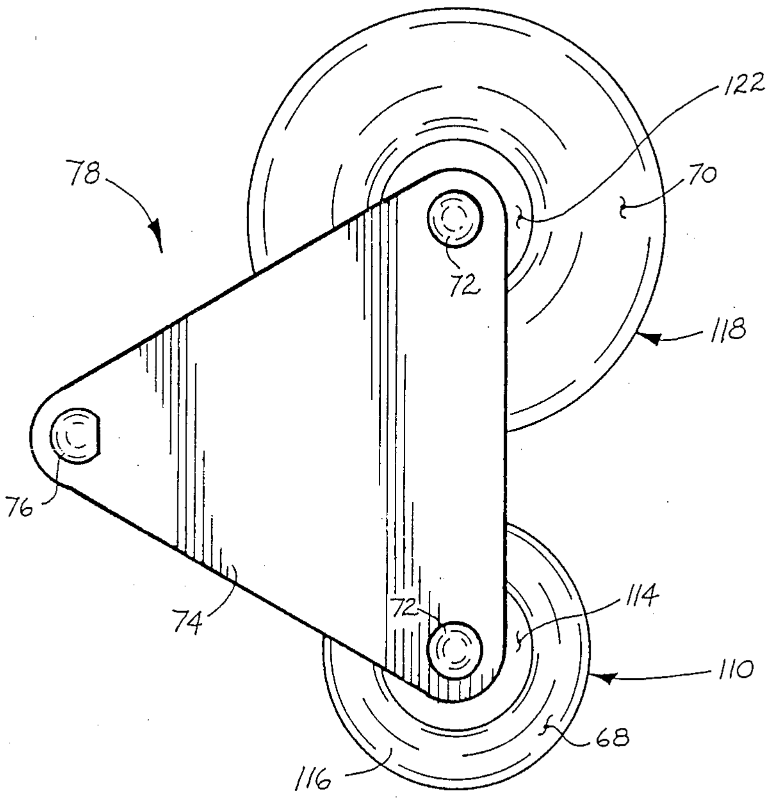
FIGS. 6 and 7 show enlarged side and end views of the roller assembly of this invention.
Figure 7:
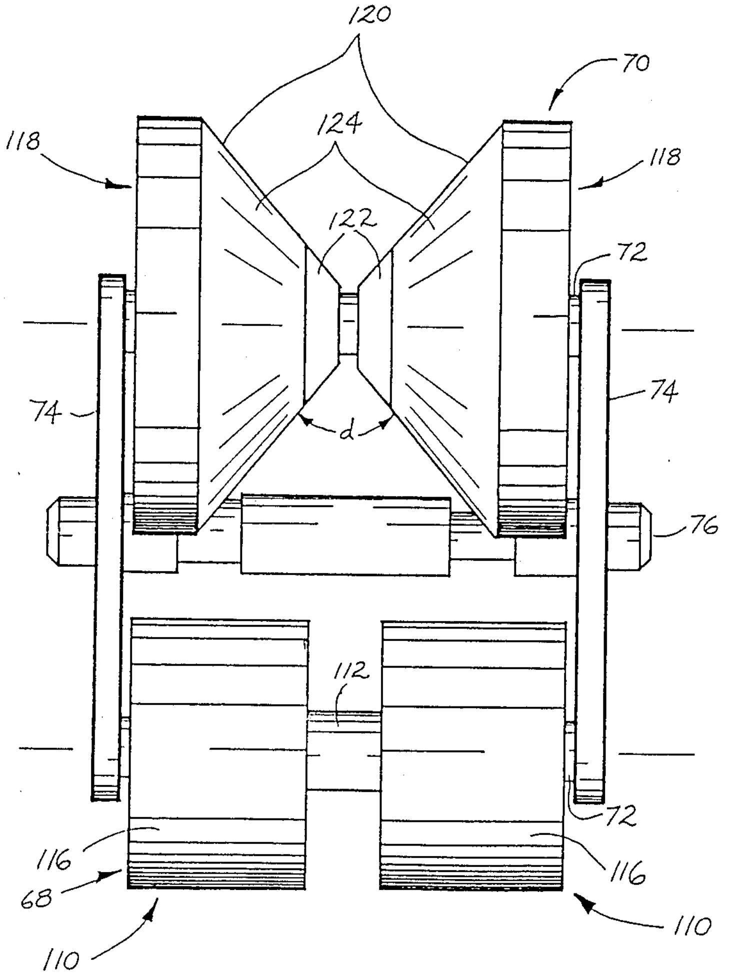

FIGS. 6 and 7 illustrate in greater detail the guide and applicator rollers 68 and 70 of this invention. As seen therein, the guide roller 68 is actually a pair of cylindrical rollers 110 mounted on shaft 72 between frame members 74 and spaced apart thereon by a spacer 112. Typically the rollers 110 could have a diameter of about 4.3 cm, a length of about 3 cm and a spacing therebetween of about 1.2 cm. Each roller 110 is actually a composite roller having a central core 114 which is harder (say 80+ durometer) than the outer rolling surface 116 (say 30 durometer).

The applicator roller 70 is actually a pair of frustoconical rollers 118 mounted on shaft 72 between frame members 74 and spaced apart by a short distance of, say, 0.3 cm. Typically the rollers 118 could have a diameter of about 7 cm and a length of about 3.4 cm. Each applicator roller includes a frustoconical surface portion 120 which faces the frustoconical portion of the other roller 118 thereby defining a generally V-shaped space therebetween. As with the guide rollers 110, each applicator roller 118 includes a central core 122 which is harder (say 80+ durometer) than the outer rolling surface 124 (say 30 durometer). With both the guide and the applicator rollers the soft outer portions would be formed from a soft urethane material and the angle (α) between the frustoconical surfaces 120 of the adjacent applicator rollers would be about 90°.

Figure 10:
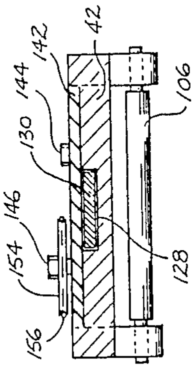
FIGS. 8, 9 and 10 show details of the tape cutting mechanism used with the applicator.
Figure 8:
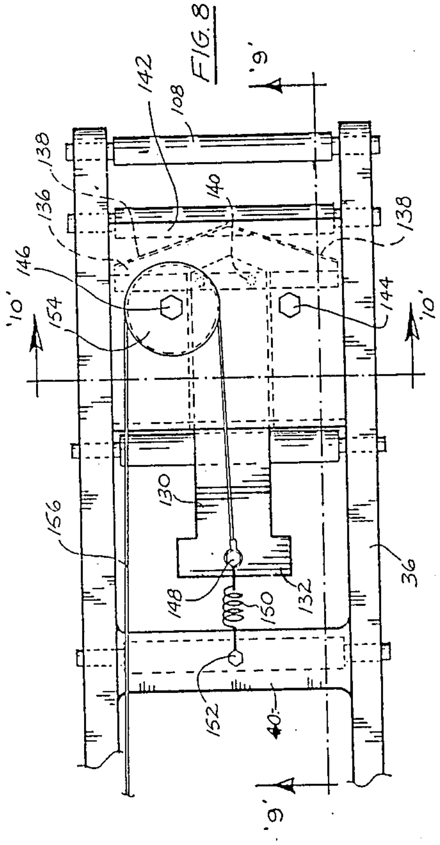
Figure 9:
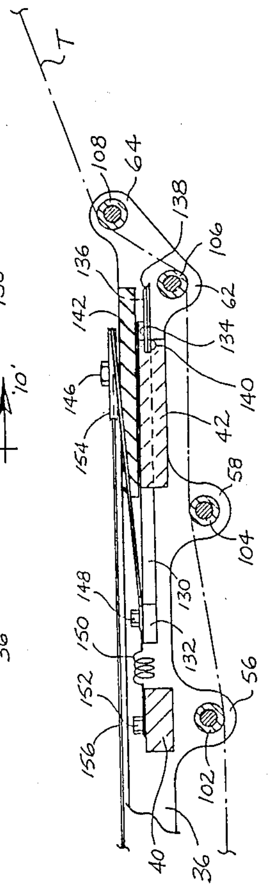

FIGS. 8, 9 and 10 show the cutter assembly 126 as used with this invention. The mechanism of this embodiment may be considered as being "passive", requiring the operator to provide the necessary cutting motion, as will be seen hereinafter.

With reference first of all to FIG. 10 it will be seen that the interconnecting web 42 is provided with a central groove 128 located in the upper portion thereof. The groove 128 is intended to guide and support a cutting blade shank 130 which has a main body section received in the groove 128 and a laterally enlarged head portion 132, seen in FIG. 8. The forward end of the shank is recessed on the bottom as at 134 to receive a cutting blade 136. The blade 136 has angled cutting edges 138 and extends the width of the opening between side walls 36. The blade may be attached to the shank by machine screws 140, thereby facilitating replacement of the blade when it becomes dull.

The shank is secured within the groove 128 by a top plate 142 which is bolted to the web 42 by bolts 144,146. The plate overlies the front and rear edges of the web, to thereby guide the shank more effectively and, at the front, to cover the sharp edges 138 of the blade 136 and thus protect an operator from inadvertently cutting himself as he grasps the tape T at the free end of the head.

At the rear end of the shank 130 a central bolt 148 secures one end of a tension spring 150 to the shank 130. The other end of the spring 150 is attached to the intermediate web 40 by a bolt 152.

The bolt 146 which is used to attach the plate 142 to the web 42 also carries a pulley 154 which can rotate thereon. The pulley 154 is located parallel to and just above the plate 142. A flexible cable 156 is attached at one end to the bolt 148 at the rear end of the shank, passes around the pulley 154 and then extends back along the head member and the handle to be connected at its other end to the slider 22. Suitable guides, not shown, may be used to ensure that the cable 156 passes from one end of the applicator to the other without interference. The cable may be of any suitable construction as long as it is flexible and exhibits negligible stretch under tension. For example aircraft wire may be used as may braided or woven cords such as might be used on drafting tables.

Operation of the cutting mechanism is readily apparent from FIGS. 8 and 9. During the application of tape to a joint the tape T is fed as shown in FIG. 9, running from left to right in the figure. When the operator approaches the end of the joint he pulls on the trigger 24, thereby pulling on the cable 156 (arrow A, FIG. 9). That pull is transmitted around the pulley 156 to the rear end of the shank 130 and the shank is moved to the right, against the spring 150 (arrow B, FIG. 9). As the shank 130 moves to the right the blade edges 138 will encounter, and cut, the tape T between the guide rollers 106,108. The released free end of the tape may then be applied to the joint through continued movement of the applicator and the operator can simultaneously release the trigger so that the spring 150 retracts the shank 130 and the attached blade 136 to its retracted or safety position.

When the tape has been cut as described above the free end of the supply roll will hang loosely between the guide rollers 104,106. The operator can then pull the tape and thread it around the rollers 106,108 and then around the guide and applicator rollers 68,70 so that he can start to apply tape to another joint.

In the event that the operator wishes to apply tape to a flat joint or to an interior corner after having applied tape to a number of exterior corners, or vice versa, he can undo the screws 98 holding the clips 94 to the carrier frame 80 to thereafter remove the frame assembly 74 carrying the guide and applicators rollers he has been using. He can replace that assembly with another assembly carrying the guide and applicator rollers appropriate to the style of joint to be taped, such as the rollers described in aforementioned Canadian Application No. 485,809. Thus, a single applicator can be used to tape both flat and interior or exterior corner joints.

Figure 11:
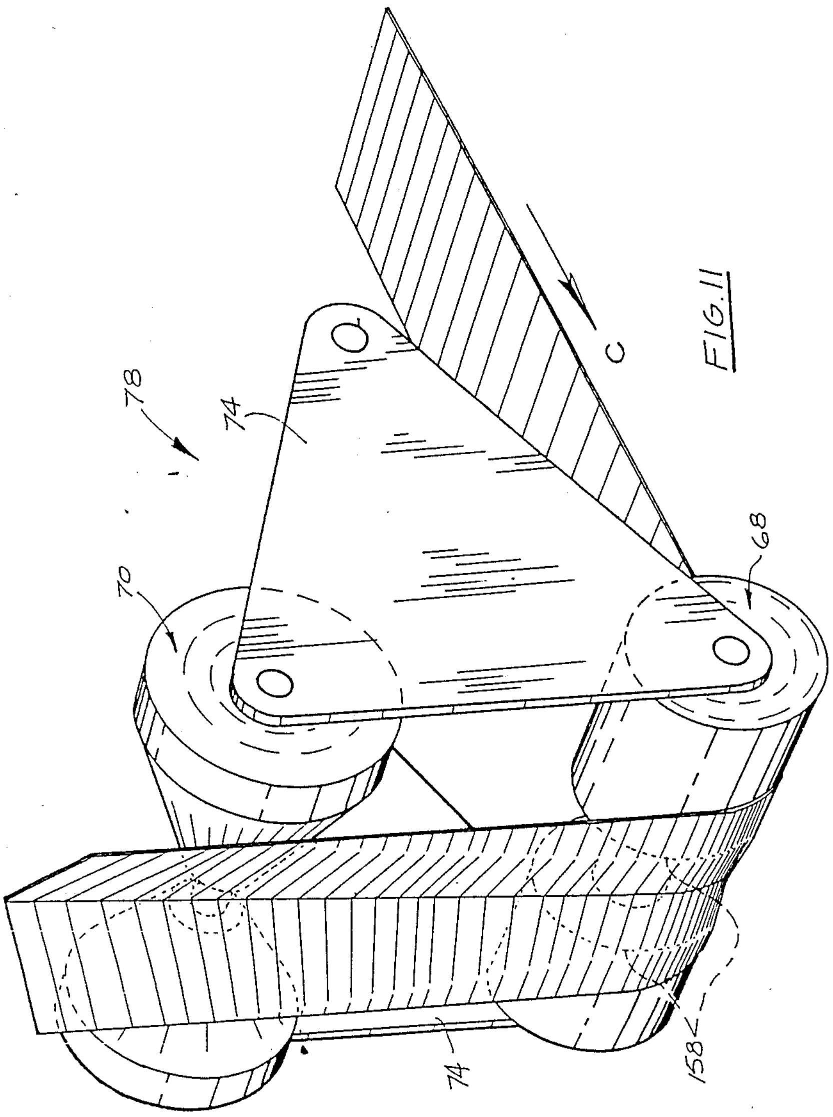
FIG. 11 shows in perspective the shaping of the tape as it is applied to the outside corner.

FIG. 11 is intended to illustrate the path of the tape in the vicinity of the roller assembly 78. The tape T is running in the direction of the arrow C as the applicator 10 and roller assembly 78 are moving downwards in the direction of the arrow D. As the applicator is moved to bring the tape into contact with a vertical exterior corner (not shown), the soft inside corners 158 of the guide rollers 110 will push the tape T to locate it on the corner and to initially preform the tape to the angle of the corner. Additional pressure on the rollers 110 as the applicator descends will cause the softer outer surface 116 to deform by collapsing thereby applying, through frictional contact with the tape, a slight stretch to the tape so that it conforms more closely to the contour of the corner.

As the applicator descends further, the applicator rollers will contact that portion of the tape T which has been initially set in place by the guide rollers 110. The soft outer surface 124 will apply a greater frictional force to the tape causing it to stretch even more and to conform very closely to the contour of the exterior corner. Since the tape T has a pressure sensitive adhesive thereon it will adhere and closely conform to the exterior corner making any further setting step unnecessary.

By using a soft urethane material as the outer surface of the guide and applicator rollers it is possible to stretch the tape around the corner through frictional contact of the soft material with the tape and it is also possible to apply tape to corners that ae not exactly 90°. For example the present invention has been used to tape corners that vary from about 80° to about 100° and this is attributable to the soft, conforming nature of the outer surface material of the rollers.

The present invention meets a specific need in the construction industry and represents a significant advance in the art of applying tape. The preferred embodiment of the invention has been disclosed herein but, undoubtedly, skilled persons could alter the structure of the invention without departing from the spirit thereof. Thus the protection to be afforded this invention is to be determined from the scope of the claims appended hereto.

The embodiments of the invention in which an exclusive property or privilege is claimed are defined as follows:

1. A roller assembly for use with a device for applying tape, taken from a roll of tape mounted in said device, to an elongated, exterior corner, said assembly comprising: a pair of generally triangular frame members; a pivot shaft extending between said frame members at one apex thereof and adapted for removable pivotable connection to said device; a pair of mounting shafts extending between said frame members, one at each of the other apices: a pair of cylindrical guide rollers mounted for rotation on one of said mounting shafts with a space therebetween, and a pair of frustoconical applicator rollers mounted for rotation on the other of said mounting shafts, the frustoconical surfaces of said applicator rollers defining a generally V-shaped zone therebetween.

2. The assembly of claim 1 wherein each of said guide and applicator rollers includes an inner cylindrical core portion and an outer surface portion, the material of the outer portion of each roller being substantially softer than the material of the core portion.

3. The assembly of claim 2 wherein the material of the outer portion of each roller is a soft urethane material.

4. The assembly of claim 1, including a cylindrical spacer member on said one mounting shaft between said cylindrical guide rollers.

5. An applicator for applying tape, provided in a roll wound on a core, to an elongated, exterior corner comprising:

(a) elongated handle means;

(b) a unitary head member including integrally formed side wall means and interconnecting end sections, said handle means being affixed to one of said end sections;

(c) a pair of axially aligned and adjustable disc members positioned between said side wall means for frictionally engaging the ends of a tape roll core located therebetween;

(d) support means projecting upwardly and forwardly from the other head member end section;

(e) a roller assembly including: a pair of generally triangular frame members; a pivot shaft extending between said frame members at one apex thereof and adapted for removable pivotable connection to said support means; a pair of mounting shafts extending between said frame members, one at each of the other apices thereof; a pair of cylindrical guide rollers mounted for rotation on one of said mounting shafts with a space therebetween; and a pair of frustoconical applicator rollers mounted for rotation on the other of said mounting shafts, the frustoconical surfaces of said applicator rollers defining a generally V-shaped zone therebetween; and (f) tape cutting means operable to cut said tape.

6. The applicator of claim 5 wherein each of said guide and applicator rollers includes an inner cylindrical core portion and an outer surface portion, the material of the outer portion of each roller being substantially softer than the material of the inner core portion.

7. The applicator of claim 6 wherein the material of the outer portion of each roller is a soft urethane material.

8. The applicator of claim 5, including a cylindrical spacer member on said one mounting shaft between said cylindrical guide rollers.

9. The applicator of claim 5 wherein said support means includes a pair of forwardly facing end faces, each with a semi-circular recess therein for reception of a corresponding portion of said pivot shaft, and wherein removable clamp means are attached to each end face for clamping the appropriate pivot shaft portion into the adjacent recess and for imposing a force thereon so as to frictionally inhibit free rotation of said shaft and said triangular frame members attached thereto.

10. The applicator of claim 9 including ear means projecting below each of said side wall means for supporting tape guide means extending across said head member, said guide means serving to direct tape from said roll to said guide and applicator rollers.

11. The applicator of claim 5 wherein said cutting means includes a generally triangular cutting blade, an elongated, planar blade carrier reciprocably located between said side wall means adjacent said other end section; means for guiding said blade carrier; anchor means extending between said side wall means; spring means connecting said anchor means to said blade carrier; and flexible means connecting said blade carrier to trigger means adjacent the free end of said handle means; whereby operation of said trigger means will move said blade carrier from a retracted safety position within said other end section to a projected position in which said cutting blade can sever said tape, and release of said trigger means will permit said spring means to retract said blade carrier from said projected position to said retracted safety position.

12. The applicator of claim 11 wherein said trigger means includes a trigger member slidably mounted to said handle means and said flexible means includes a cable connected at one end thereof to said trigger member, said cable extending along said handle means and said head member to and around a rotatable pulley member adjacent said other end section, and being connected at its other end to said blade carrier adjacent the innermost end thereof.

13. The applicator of claim 12 wherein said pulley member is parallel to said blade carrier.

14. The applicator of claim 12 wherein said cable is formed from fine aircraft wire.

15. The applicator of claim 12 wherein said cable is formed from braided or woven cord.

16. The applicator of claim 5 including main grip means at the free end of said handle means and auxiliary holding means adjustably mounted on said handle means, said auxiliary holding means including a generally annular collar closely fitting on said handle means for sliding and rotating movement thereon, a radially extending threaded bore through the collar, a plug received in the bore adjacent the handle means, and a grip member having a threaded rod projecting therefrom for threaded engagement with the bore to thereby lock the plug against said handle means and thus prevent movement of the holding means relative to said handle means.

* * * * *